United States Patent

Miyazaki et al.

[11] Patent Number: 5,847,536
[45] Date of Patent: Dec. 8, 1998

[54] MOTOR CONTROL CIRCUIT EQUIPPED WITH CORRECTION MEANS THEREIN

[75] Inventors: Hiroshi Miyazaki; Masaaki Ono, both of Kanagawa-ken, Japan

[73] Assignee: Kabushiki Kaisha Toshiba, Kawasaki, Japan

[21] Appl. No.: 742,697

[22] Filed: Nov. 4, 1996

Related U.S. Application Data

[63] Continuation of Ser. No. 396,071, Feb. 28, 1995, abandoned, which is a continuation of Ser. No. 84,942, Jul. 2, 1993, abandoned.

[30] Foreign Application Priority Data

Jul. 3, 1992 [JP] Japan .................................. 4-176451

[51] Int. Cl.$^6$ ...................................................... H02P 5/34
[52] U.S. Cl. ............................................ 318/811; 318/801
[58] Field of Search ............. 318/298–84; 388/804–822; 332/109–111

[56] References Cited

U.S. PATENT DOCUMENTS

| | | | |
|---|---|---|---|
| 4,059,789 | 11/1977 | Cocksedge | 318/608 |
| 4,342,077 | 7/1982 | Passey et al. | 318/605 |
| 4,342,952 | 8/1982 | Bowie | 318/654 |
| 4,371,782 | 2/1983 | Brouwer | 318/577 |
| 4,488,103 | 12/1984 | Morinaga et al. | 318/811 |
| 4,599,550 | 7/1986 | Robertson et al. | 318/811 |
| 4,620,143 | 10/1986 | Matty | 318/811 |
| 4,833,586 | 5/1989 | Inaba et al. | 318/811 X |
| 4,849,871 | 7/1989 | Wallingford | 318/811 X |
| 5,023,538 | 6/1991 | Mutoh et al. | 318/811 |
| 5,150,030 | 8/1992 | Ito et al. | 318/811 |
| 5,168,439 | 12/1992 | Kumar et al. | 318/811 X |
| 5,184,310 | 2/1993 | Takenouchi | 318/811 X |
| 5,200,682 | 4/1993 | Kim et al. | 318/809 X |
| 5,309,075 | 5/1994 | Yokoe et al. | 318/608 |
| 5,329,217 | 7/1994 | Kerkenen et al. | 318/811 |
| 5,436,545 | 7/1995 | Bahr et al. | 318/727 |

FOREIGN PATENT DOCUMENTS

| | | |
|---|---|---|
| 61-52497 | 4/1986 | Japan . |
| 61-240859 | 10/1986 | Japan . |
| 64-30462 | 2/1989 | Japan . |

*Primary Examiner*—David S. Martin
*Attorney, Agent, or Firm*—Foley & Lardner

[57] ABSTRACT

A motor control device capable of providing an appropriate and most suitable motor current waveform, in order that efficiency and power factor for the motor is significantly improved and the high frequency and noise thereof are reduced. In an inverter type motor control circuit including a pulse width modulation waveform synthesis circuit by which a plurality of switching elements are controlled so as to obtain an A.C. power having a predetermined frequency, the pulse width modulation waveform synthesis circuit includes: memory circuit for storing a reference pulse waveform data series in order to control the switching elements; phase control circuit for controlling a starting stage of the reference pulse waveform data series which is read from the memory means; and modifying circuit for modifying and correcting a reference level of the motor control circuit so that a duty ratio of the reference pulse waveform data series is uniformly varied.

2 Claims, 9 Drawing Sheets

PWM SIGNAL (INTEGRATED)

MOTOR CURRENT

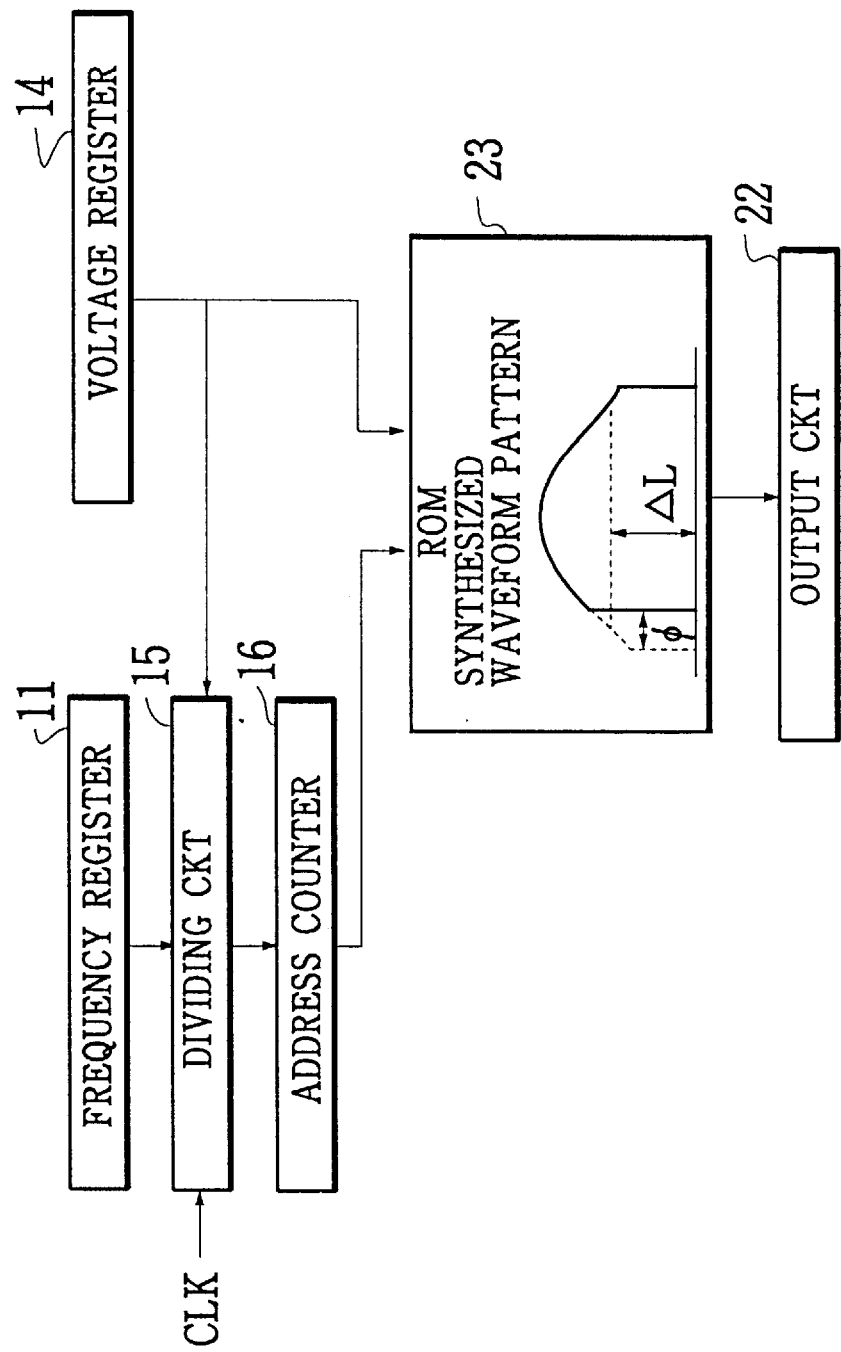

DUTY RATIO SCALED UP    DUTY RATIO EXPANDED

MOTOR CONTROL CIRCUIT EQUIPPED WITH CORRECTION MEANS THEREIN

This application is a continuation of application Ser. No. 08/396,071, filed Feb. 28, 1995, now abandoned, which is a continuation of application Ser. No. 08/084,942, filed Jul. 2, 1993, now abandoned.

BACKGROUND OF THE INVENTION

1. Field of the Invention

The present invention relates to an inverter motor control circuit for driving an induction motor and so on.

2. Description of the Prior Art

With reference to FIG. 1, there is available, for example, a conventional inverter type motor control circuit. The circuit shown in FIG. 1 includes therein a single-phase inverter circuit having a half-bridge configuration. In the same figure, the reference numerals 1a, 1b designate an a.c. power supply input terminal, the reference 102 a voltage doubler rectifying/smoothing circuit, and the reference numeral 103 is a load for an inverter. As for the numeral 103, there are, for example, a single-phase induction motor. Moreover, in the circuit shown in FIG. 1, the reference numerals 104, 105 are switching elements where one end of the single-phase induction motor 103 is connected to an intermediate potential of doubler rectifying/smoothing circuit 102, and other end of the single-phase induction motor 103 is connected to the intermediate potential of a half-bridge circuit consisting of switching elements 104, 105. The reference numerals 106, 107 are switching element drive circuits. The reference numeral 108 designates a switching element drive waveform synthesis circuit.

Next, the inverter type motor control circuit will be described in terms of operation thereof as follows.

The a.c. voltage of an a.c. power source which is electrically connected to the a.c power supply input terminals 1a, 1b, is converted to a d.c. voltage having the intermediate potential by means of the doubler voltage rectifying/smoothing circuit 102. In switching elements 104, 105, a high frequency pulse in which an interpolated frequency thereof ranges from some kHz to some tens of kHz, serves to switch ON and OFF the switching elements 104, 105. Moreover, switching elements 104, 105 are driven alternately at a drive frequency of some tens through hundreds of Hz. The d.c. voltage is converted to the a.c. voltage having a predetermined frequency by those switching elements such as 104 and 105, so as to be fed to the single-phase induction motor 103. The speed of single-phase induction motor 103 is controlled by, for example, varying the drive frequency or duty ration of an inverter output waveform.

With reference to FIG. 2, there is shown a block diagram for switching element drive waveform synthesis circuit 108. In the same figure, the reference numeral 11 designates a frequency register by which a drive frequency of single-phase induction motor 103 is set. The reference numeral 14 is a voltage register, 16 an address counter, 15 a frequency dividing circuit that is capable of varying a dividing ratio of frequency, 17 a mask ROM that stores a sinusoidal wave voltage pattern and 22 an output circuit.

The operation of switching element drive waveform synthesis circuit 108 is as follows. Data series for sinusoidal wave pulse modulated waveform is stored, in advance, corresponding to a plurality of voltages. Then, a drive signal is generated based on the data series. The data series can be sequentially taken out from mask ROM 17 by that a voltage pattern based on voltage register 14 forwards address counter 16. Thereafter, the data series is input to output circuit 22 so as to be output serving as drive signals for switching elements 104, 105. The drive frequency of single-phase induction motor 103 is such that based on a value set at frequency register 11 a dividing ratio of dividing circuit 15 is set at a drive frequency ranging from some tens through some hundreds so that the motor can be operated at such a various range indicated and the frequency of a signal which forwards address counter 16 can be varied.

With reference to FIGS. 3a through 3d, there is shown an example of a drive waveform output from the switching element drive waveform synthesis circuit 108. With reference to FIG. 3a and FIG. 3b, there are shown drive waveforms of switching elements 104 and 105 respectively. In FIG. 3c, there is shown an effective value for one side of the drive signal, being a sinusoidal wave. The drive signal of the sinusoidal wave shown in FIG. 3c is one of data stored in mask ROM 17 shown in FIG. 2. In FIG. 3d, there is shown an example of a motor current where the motor is driven according to the drive signal shown in FIG. 3a or FIG. 3b. As shown in FIG. 3d, since a load characteristic therefor is not purely resistance-oriented in the motor driven by a drive wave form of the sinusoidal wave, the current waveform is not necessarily a sinusoidal wave even if the voltage waveform of the sinusoidal wave is applied thereto. In other words, since the load has a component such as reactance or inductance, the circuit must suffer from such a component as reactance or inductance. Moreover, the current waveform presents rather close to a triangular waveform, so that a power factor thereof may deteriorate. Moreover, due to the voltage drop of a semiconductor element that constitutes the rectifying circuit and the inverter circuit, the a.c. voltage synthesized and applied to the motor is lower than that of inputted a.c. power supply.

In the above description, there was used the single phase inverter method using a half bridge configuration, as the motor control circuit. The same argument and facts thereof are similarly applicable to a full bridge configured single-phase inverter, three-phase inverter and other multi-phase inverter methods and the like.

In the conventional practice for the inverter type motor control circuits where a sinusoidal wave pulse with modulation drive signal controls the motor, the electrical characteristic for the load is not composed of pure resistance alone. Therefore, a motor current therefor does not necessary present a sinusoidal wave, so that there are caused deteriorations of efficiency thereof and the power factor, and a high frequency wave is generated and a noise is caused thereby. Moreover, due to a voltage loss of the semiconductor element constituting the inverter circuit, applied current thereto is reduced compared to a case where the current is directly applied thereto.

SUMMARY OF THE INVENTION

In view of the foregoing drawbacks, it is therefore an object of the present invention to provide a motor control device capable of providing an appropriate and most suitable motor current waveform, so that efficiency and power factor for the motor is significantly improved and the high frequency and noise thereof are reduced.

To achieve the object, there is provided an inverter type motor control circuit including a pulse width modulation waveform synthesis circuit by which a plurality of switching elements are controlled so as to obtain an A.C. power having a predetermined frequency, the pulse width modulation waveform synthesis circuit comprising: memory means for storing a reference pulse waveform data series in order to control the switching elements; phase control means for controlling a starting stage of the reference pulse waveform data series which is read from the memory means; and modifying means for modifying and correcting a reference level of the motor control circuit so that a duty ratio of the reference pulse waveform data series is uniformly varied.

To achieve the object there is also provided a method for synthesizing a pulse width modulation waveform in an inverter type motor control circuit, the method comprising the steps of: setting up a value by a phase controlling storage of the motor control circuit; outputting a sinusoidal wave at the position that is shifted forward, by a predetermined value, a phase of the sinusoidal wave; reading out data from a memory of the motor control circuit; adding a corrected value set up by an correction circuit of the motor control circuit, to the data read out from the memory circuit; and multiplying a voltage value set up by a voltage storage of the motor control circuit, to the added value.

Other features and advantages of the present invention will become apparent from the following description taken in conjunction with the accompanying drawings.

BRIEF DESCRIPTION OF THE DRAWINGS

FIG. 7 is configuration for switching element drive signal generating circuit 9 according to the second embodiment for the present invention.

FIG. 9a and FIG. 9b are pulse width modulation waveform to be output.

FIG. 9c and FIG. 9d are effective values of the pulse width modulation waveform viewed through a filter attached thereto, where a solid line shows an example in which the pulse width is partially widened.

FIG. 9e is an examples of motor current.

FIG. 9f is an example in which the motor current close to the triangular wave (indicated with dotted lines) is approximated to the sinusoidal wave (indicated with the solid lines).

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings of FIG. 4 through FIG. 10.

Embodiment No. 1

FIGS. 4 through 7 show the first embodiment of the present invention. Now, in the rest of figures representing the present invention, elements and circuits having the same reference numbers thereon will be omitted the detail description thereof.

Figure 4:
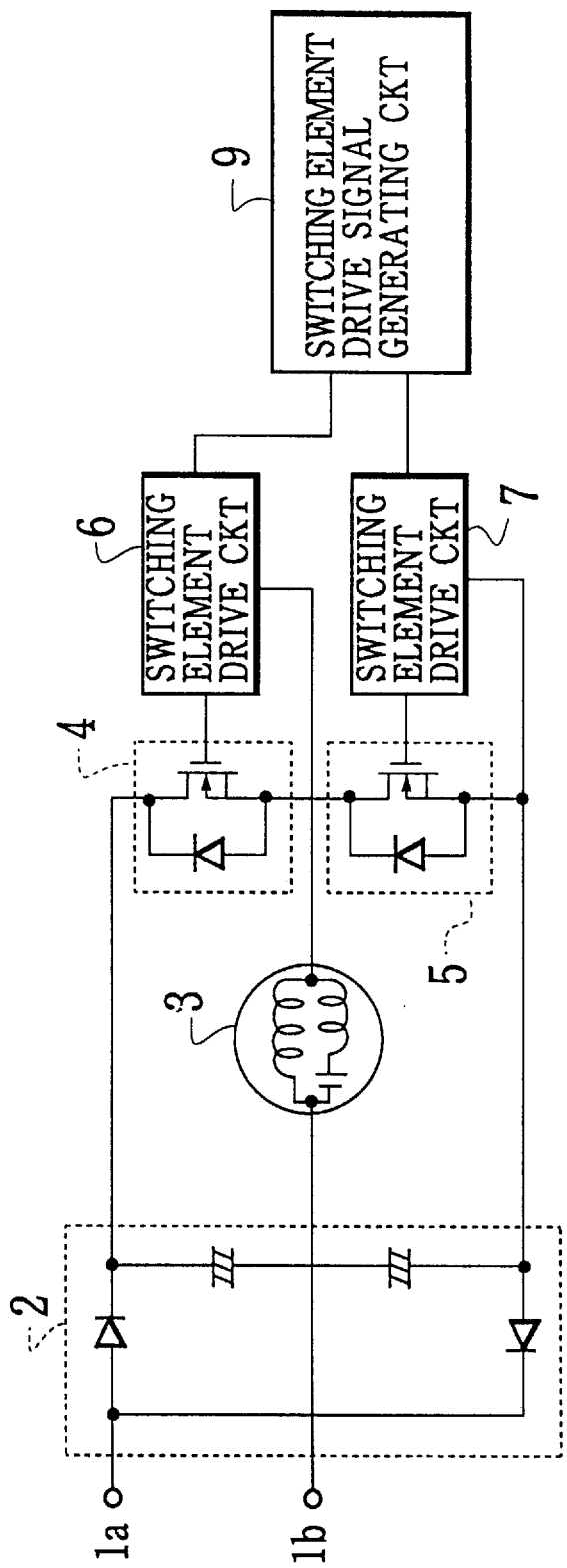
FIG. 4 is a circuit configuration for the first embodiment according to the present invention.

With reference to FIG. 4, the reference number 9 designates a switching element including a pulse width modulation (PWM) member. Switching element 9 is capable of uniformly expanding an output starting phase and duty ratio so as to vary an offset amount. Therefore, switching element 9 can be applied to various types of motors. For example, such a switching element as indicated with the reference 9 is applicable to various sizes of the motors. Switching element 9 may be referred to as a switching element drive signal generating circuit as shown in FIG. 4. The switching element drive signal generating circuit 9 will be described in more detail as follows.

Figure 5:
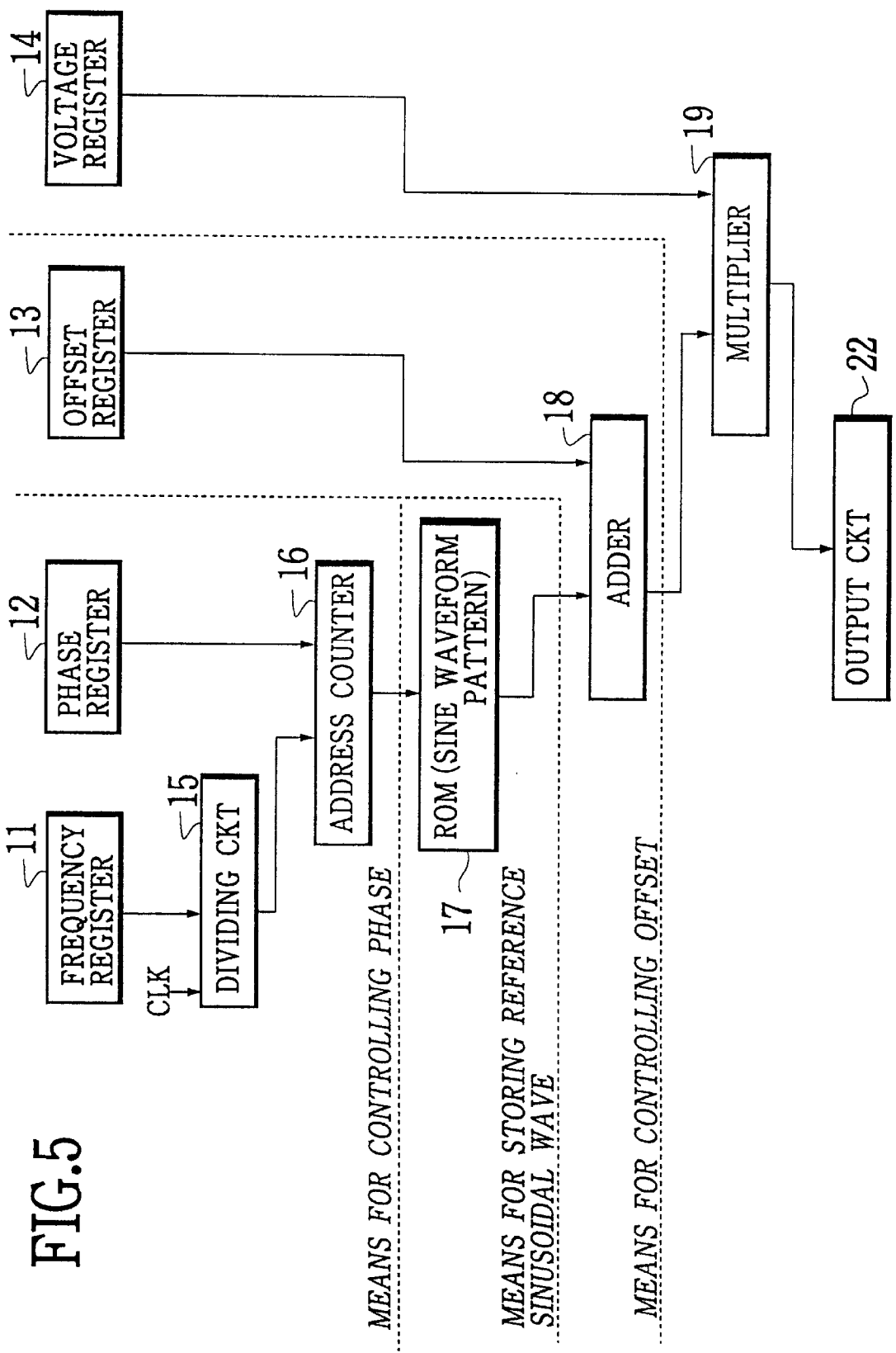
FIG. 5 shows an example of circuit construction for switching element drive signal generating circuit 9 shown in FIG. 4.

With reference to FIG. 5, there is shown an example of circuit construction for switching element drive signal generating circuit 9. In FIG. 5, the reference numeral 12 designates a phase register serving as means for controlling the phase thereof, 13 an offset register and 18 an adder. The offset register 13 and the adder 18 constitute an offset controlling means. In the same figure, the reference numeral 17 is a mask ROM serving as means for storing data and 19 a multiplexer. The operation for switching element drive signal generating circuit 9 is as follows.

Frequency register 11 determines a frequency divider ratio of dividing circuit 15, and then determines a frequency that increments address counter 16. Now, notice that the dividing circuit and a frequency divider are interchangeably termed and used in this application hereinafter.

In other words, by varying the speed at which data is read out from mask ROM 17, the drive frequency for single phase induction motor 3 is varied. Then, a value set at phase register 12 is added to an address of mask ROM 17 and is taken out to address counter 16. In other words, by a value set at phase register 12, it becomes possible to output a sinusoidal wave at the position that is shifted forward by a predetermined value of φ the phase of the sinusoidal wave. Data taken out from mask ROM 17 is added a value set by offset register 13 by means of adder 18, so that a value set by voltage register 14 is multiplied thereto by multiplier 19. Namely, a predetermined offset value ΔL that is a reference level from a zero level is set by offset register 13. By the offset value set by offset register 13, the duty cycle of the pulses forming the sinusoidal wave is uniformly expanded by uniformly increasing the width of the pulses so that the sine wave is uniformly varied (in a shape of a bottom thereof being jacked up), so that the motor current can obtain continuity therein.

Moreover, the multiplication of a value of multiplier 19 changes relatively each pulse width so as to vary a voltage density, thereby enabling to control the speed of single phase induction motor. By executing the afore-mentioned operation, a value at each register can be set at any value by software means. Consequently, the phase and offset are arbitrarily controlled, and the motor current is sequentially optimized in response to the control state of single phase induction motor so as to generate a sinusoidal wave accordingly.

Figure 6A:
FIG. 6a and FIG. 6b show output waveforms of switching element drive signal generating circuit 9.
Figure 6B:
Figure 6C:
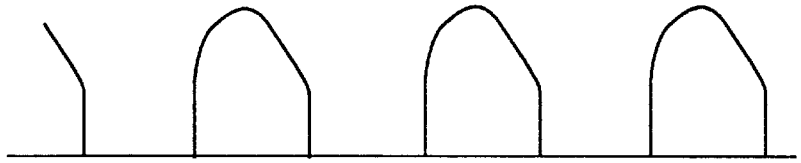
FIG. 6c and FIG. 6d are effective values for the output waveforms.
Figure 6D:
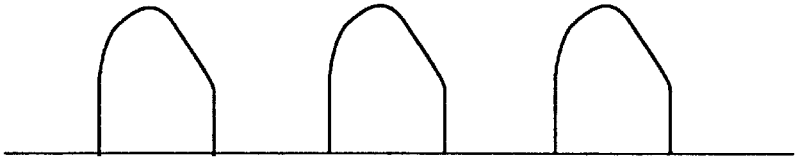
Figure 6E:
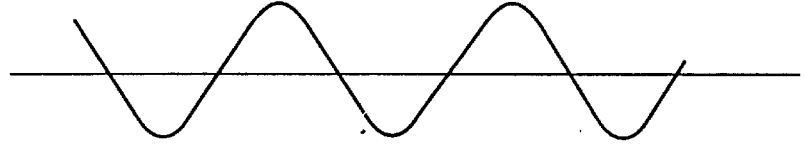
FIG. 6e and FIG. 6f are waveforms where a predetermined offset value ΔL of the reference level over a zero level is added to form a waveform in which the duty ratio of the sinusoidal waveform is uniformly expanded.
Figure 6F:
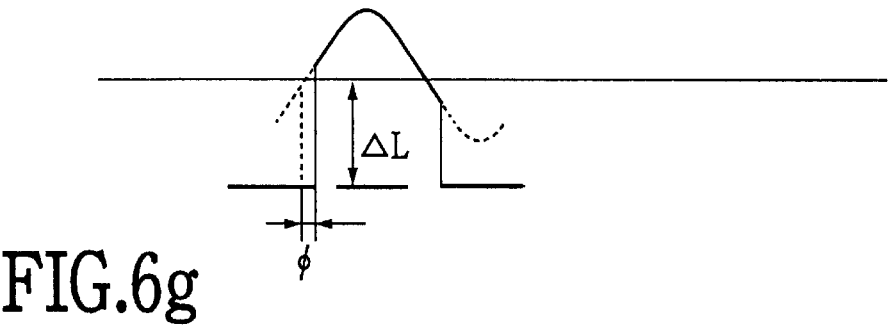
Figure 6G:
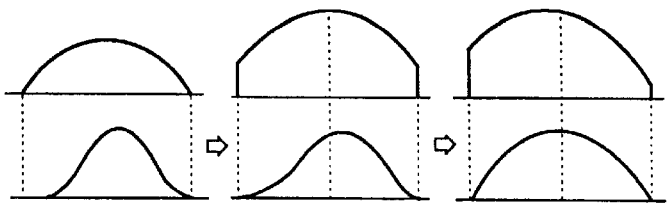
FIG. 6g shows waveforms after an offset (correction) values is added to PWM signal and motor current, respectively.
Figure 10:
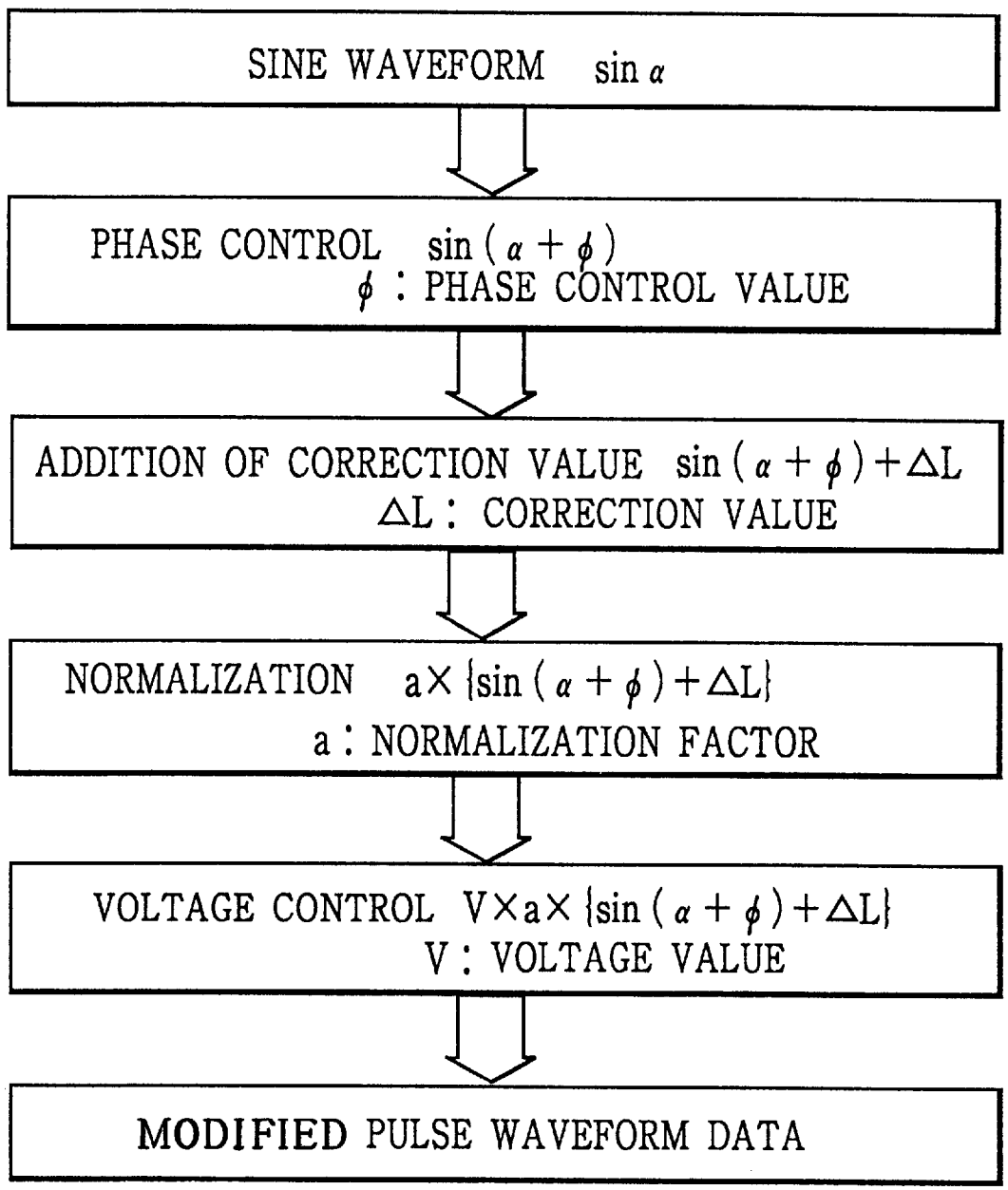
FIG. 10 shows a flowchart for calculating the reference pulse wave data series.

Moreover, there is no more need for changing data of ROM 17 in accordance with a type or kind of motor and controlling specification therefor in use. The otherwise inconvenience would be cured by a treatment where variables of the software are appropriately changed to match the situation in question, thus productivity thereof being superior over the conventional practice. FIGS. 6a through 6g show waveforms in operation. FIG. 6a and FIG. 6b show output waveforms of switching element drive signal generating circuit 9. FIG. 6c and FIG. 6d are effective values for the output waveforms. FIG. 6e and FIG. 6f are waveforms where a predetermined offset value ΔL of the reference level over a zero level is added to form a waveform in which the duty ratio of the sinusoidal waveform (that is the effective value) is uniformly expanded (see FIG. 6f). With reference to FIG. 10, there is shown a flowchart for calculating the modified reference pulse wave data series mentioned in right above paragraph.

In this case shown in FIG. 10, there is used data composed of sinusoidal wave data that is shifted forward by phase-controlling amount φ away from angle α which forms a reference level, where α ranges from 0 to 180 degrees. Correction value ΔL is added to the obtained data, then normalization factor a is multiplied thereto so as to execute a normalization process therefor. Here, the normalization factor is preferably such that a=1/(1+ΔL). Thereafter, voltage value V is multiplied thereto so as to obtain the modified reference pulse wave data.

Embodiment No. 2

FIG. 7 is configuration for switching element drive signal generating circuit 9 according to the second embodiment for the present invention.

Figure 1:
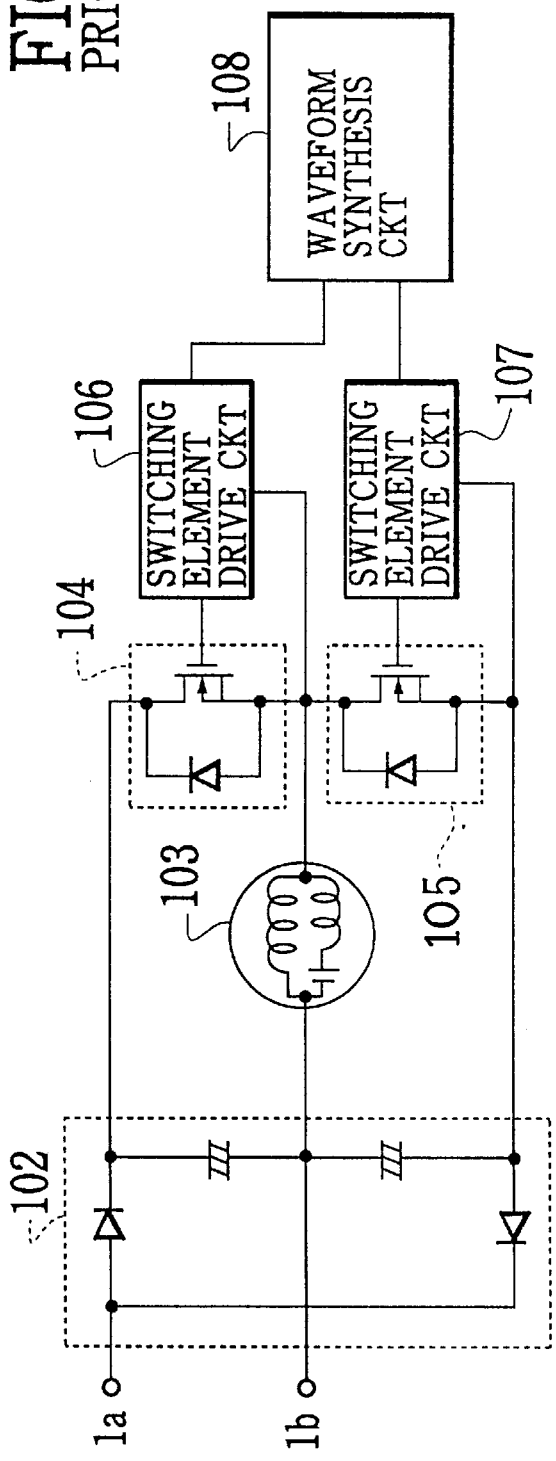
FIG. 1 is a circuit block diagram showing a conventional inverter type motor control circuit.
Figure 2:
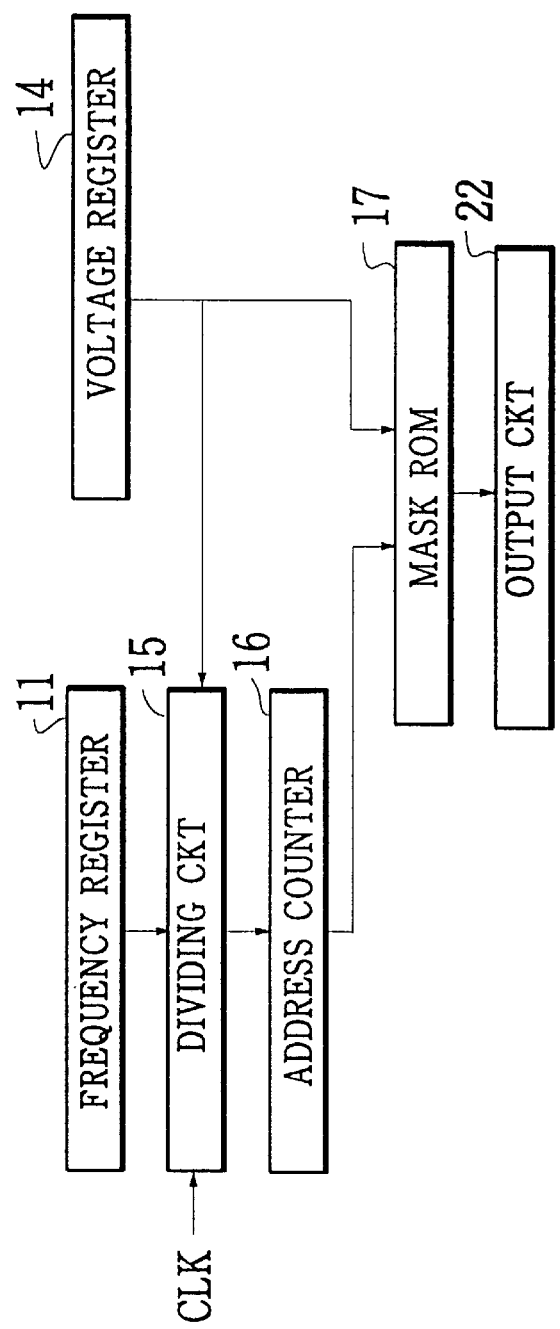
FIG. 2 is a block diagram for switching element drive waveform synthesis circuit 108 shown in FIG. 1.
Figure 3A:
FIG. 3a and FIG. 3b show drive waveforms of switching elements 104 and 105 respectively.
Figure 3B:
Figure 3C:
FIG. 3c shows an effective value for one side of the drive signal, being a sinusoidal wave.
Figure 3D:
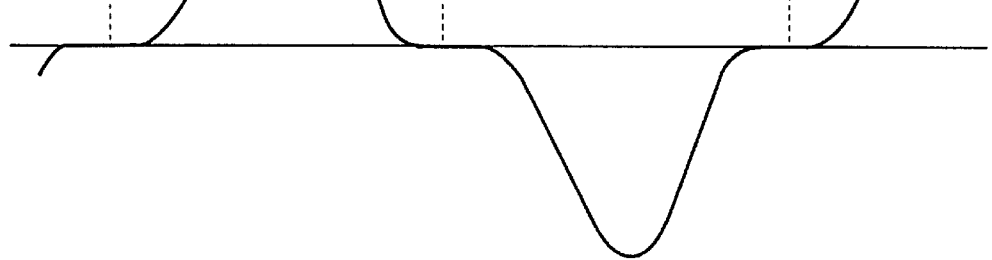
FIG. 3d, shows an example of a motor current where the motor is driven according to the drive signal shown in FIG. 3a or FIG. 3b.

In this second embodiment, difference thereof from the conventional practice shown in FIG. 2 lies in that the content of data stored in ROM 23 serving as a memory means differs from that shown in FIG. 2. In ROM 23, there is stored therein a reference pulse wave data series. The data series or data array is obtained after offset amount ΔL over the reference level is, in advance of other procedures such as normalization and voltage controlling, controlled optimally. Not to mention, the offset amount ΔL over the reference level is provided for the purpose of changing uniformly a starting phase φ and the duty ratio. Frequency divider 15 divides a reference frequency based on a value set in frequency register 11. Then, determined is a frequency by which address counter 16 is incremented. Thereafter, data is retrieved from ROM 23's addresses that are determined by address counter 16 and voltage register 14, so that the retrieved data is input to the output circuit for outputting the drive signal. Operating waveforms therefor are identical to those shown in FIG. 6a through FIG. 6g.

With reference to FIG. 10, there is shown a flowchart for calculating the modified reference pulse wave data series mentioned in right above paragraph. In this case shown in FIG. 10, there is used data composed of sinusoidal wave data that is shifted forward by phase-controlling amount φ away from angle a which forms a reference level, where α ranges from 0 to 180 degrees. Correction value ΔL is added to the obtained data, then normalization factor a is multiplied thereto so as to execute a normalization process therefor. Here, the normalization factor is preferably such that a=1/(1+ΔL). Thereafter, voltage value V is multiplied thereto so as to obtain the modified reference pulse wave data.

Though the construction employed in the second embodiment does not enable to change the waveform freely by the software, the construction of this second embodiment is advantageous in having further simplified construction over that of the first embodiment. Moreover, the second embodiment presents same advantageous effects as described in the first embodiment.

Embodiment No. 3

Figure 8:
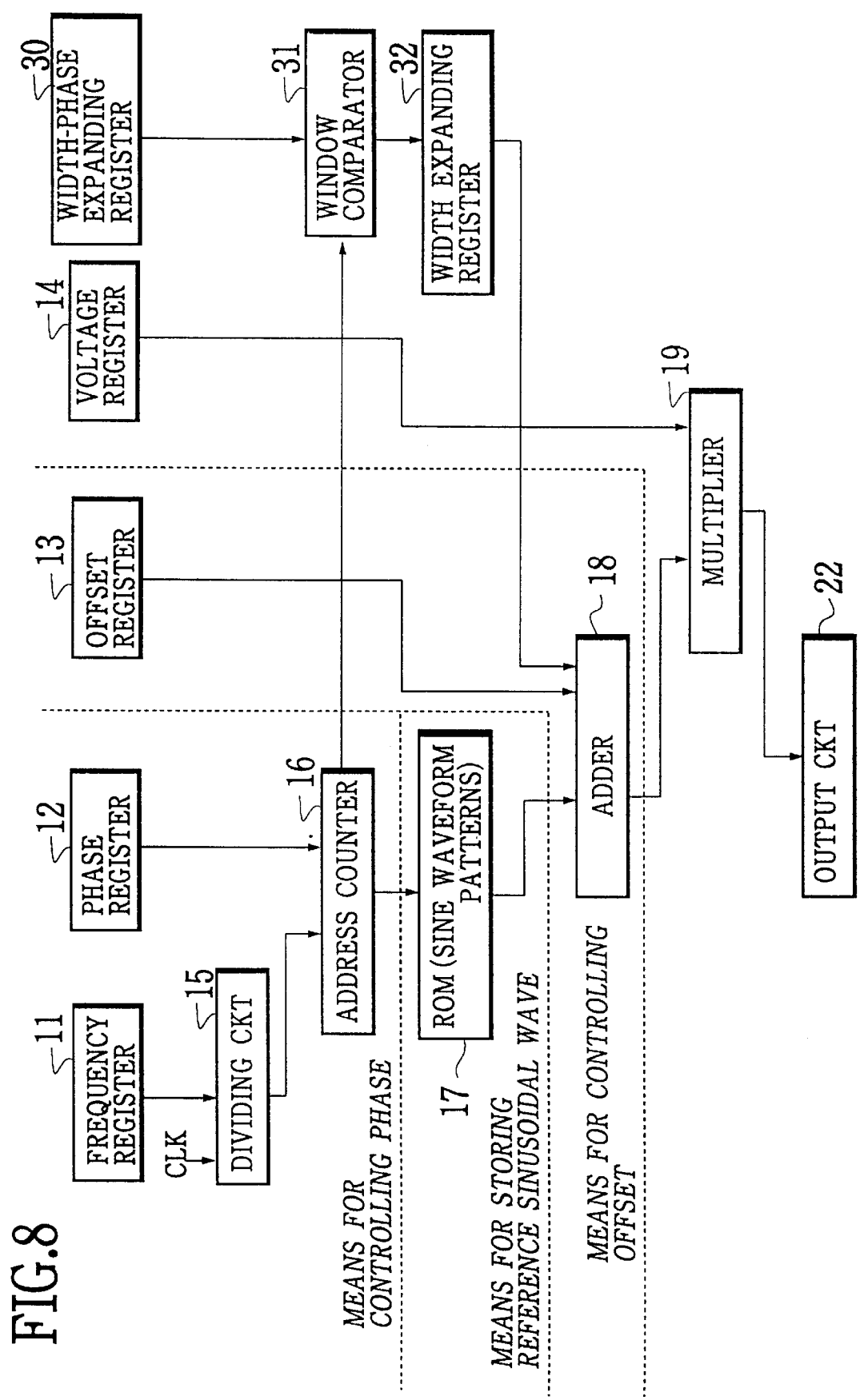
FIG. 8 shows a switching element drive signal generating circuit according to the third embodiment.

With reference to FIG. 8 and FIG. 9, there are shown a switching element drive signal generating circuit and an operating waveform therefor, respectively, according to the third embodiment. In this third embodiment, the duty ratio is partially expanded in a phase having a specific location of the reference pulse wave data series. Thereby, the motor current is properly controlled.

With reference to FIG. 8 showing the switching element drive signal generating circuit, the reference numeral 30 is a width expanding phase register, 31 a window comparator and 32 a width-expanding register. The operation of the switching element drive signal generating circuit is described in detail as follows.

Frequency register 11 determines a frequency dividing ratio of frequency diving circuit 15, and determines the frequency by which increments address counter 16. In other words, even if there is used data having the same pattern, the frequency for driving the motor can be changed by varying the speed at which the data is read out. Address counter 16 determines an address by which data of ROM 17 is retrieved. Then, any arbitrary data from any given phases can be retrieved by setting phase register 12 accordingly. Namely, thanks to a value set by phase register 12, a sinusoidal wave can be output from the position where the phase of the sinusoidal wave is forwarded. The data retrieved from ROM 17 is added a value set by offset register 13, at adder 18. Thereafter, thus added data is multiplied by a value set by voltage register 14, at multiplier 19. In other words, the sinusoidal wave is processed such that the duty ratio thereof is uniformly expanded by off-set register 13, thereby providing the motor current with a smooth continuity.

Moreover, a value of voltage register 14 is multiplied by multiplier 19 so that each pulse width is varied in a relative manner to each other in order to vary the current, thus realizing to control the speed of the motor. Moreover, the duty ratio is expanded at a position indicated by width-expanding phase register 30, so that a pulse width can be expanded by as much degree as indicated by width expanding register 32, at the phase indicated by width-expanding phase register 30. In other words, in the case where the drive current is close to a triangular wave, pulse expansion of a specific phase result in being close to a sinusoidal wave. Moreover, in the case where the drive current is of sinusoidal waveform, the pulse width thereof is expanded so that a larger power can be supplied compared to the case in the sinusoidal wave, thus a maximum speed of rotation for the motor being further improved. Though it is assumed that the current waveform may be distorted and some noise may be produced at the time the maximum speed of rotation is increased, the noise thus generated will not cause a problem thanks to a motor sound caused thereby if situation is limited to relatively high speed of rotation. As described in the above operational process, it is possible to arbitrarily set up a value for each register quickly by the software. Thereby, the phase, off-set degree and pulse width can be optimally controlled, so that the motor current can be sequentially optimized according to a control state of the motor. In this third embodiment, similar to the first embodiment, there is no need for changing data stored in ROM 17 according to the type, kind and the control specification of the motor in use. This is because such an occasion can be handled by that variables are changed by the software, thus resulting in improvement of productivity therefor.

Figure 9A:
FIG. 9a through FIG. 9f show an operating waveform for that shown in FIG. 8.
Figure 9B:
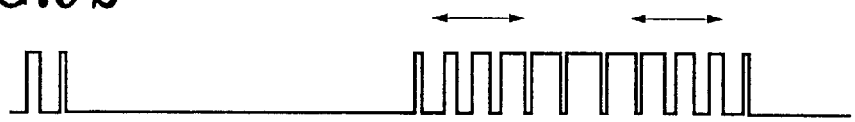
Figure 9C:
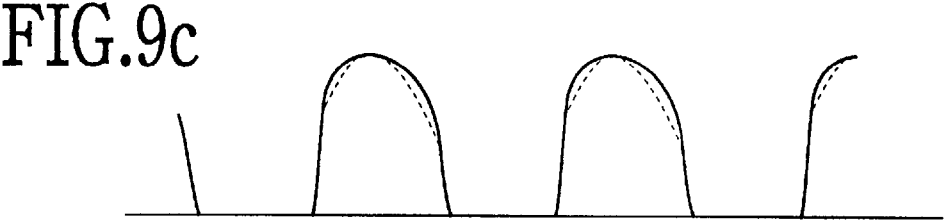
Figure 9D:
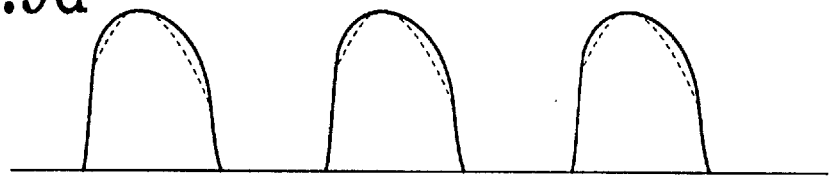
Figure 9E:
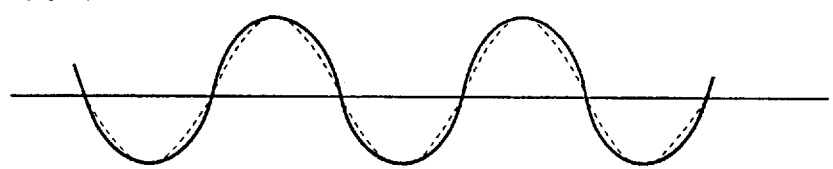
Figure 9F:
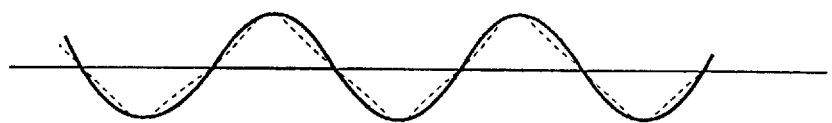

With reference to FIGS. 9a through 9f, FIG. 9a and FIG. 9b are pulse width modulation waveform to be output. FIG. 9c and FIG. 9d are effective values of the pulse width modulation waveform viewed through a filter attached thereto, where a solid line shows an example in which the pulse width is partially widened. FIG. 9e is an examples of motor current. FIG. 9f is the example of the motor current. In FIG. 9e, the pulse width is widened in part thereof so as to supply more power than in the case having the sinusoidal wave (indicated with the dotted lines), thus resulting in increased number of revolution. By the same token, FIG. 9f is an example in which the motor current close to the triangular wave (indicated with dotted lines) is approximated to the sinusoidal wave (indicated with the solid lines).

It shall be appreciated that alternatively the switching element may be configured in a manner represented in FIG. 7, and the phase is forwarded to an optimum position beforehand relative to the reference pulse waveform data series, off-set correction is added thereto, and a plurality of voltage patterns, where the pulse width is partially widened, may be stored in ROM on demand, as in the first and second embodiments. However, it is also possible to store several or a plurality of different types of patterns in which the degree of pulse widening partially differ from one other. In these alternative embodiments, configuration thereof differs in a manner similar to that shown in FIG. 7; that is to say, it is not possible to alter the waveforms freely by the software. However, the configuration realized in this third embodiment is more simplified over the second embodiment and present the same advantageous effects as shown in FIG. 7.

Moreover, it shall be appreciated that configuration represented by the above embodiments may be such that one or plural register(s) shown in FIG. 5 or FIG. 8 is or are omitted or, one or plural register(s) is or are newly added thereto especially in FIG. 4. In this case, flexibility and generality as a control system may be somehow decreased, instead, further simplified configuration thereof having the same advantageous effects as in the embodiments may be achieved. In other words, under implementation of the most possibly simplified structure thereof, necessary parameters such as φ and ΔL can be freely and arbitrarily set up. Though the above description is directed to the case of half-bridge type single-phase inverter, the present invention may be applied to full-bridge type single-phase inverter, three-phase inverter and other multiple phase inverters as well.

Notice that the terms offset and correction are also interchangeably used in this application.

In summary, by implementing the present invention, as the drive signal of plural switching elements to which the d.c. power is input, there is generated a signal in a manner that the starting phase of the reference pulse waveform data series as well as the off-set (correction) amount are predeterminedly varied. Thereby, the motor current is properly altered to the sinusoidal wave, so that the efficiency of the motor is significantly improved and the power factor thereof is also improved. Moreover, the high frequency accompanied thereby is reduced, so that the noise can be reduced. Moreover, since the drive signal waveform can be generated by the use of software, there can be obtained an optimum drive signal, having executed under the optimal control procedure, suitable to and according to the type, specification and the control conditions of the motor, thus improving the productivity thereof.

The present invention also features that the pulse width modulation waveform synthesis circuit is equipped with memory means which stores the reference pulse waveform data series which is obtained after the starting phase of the reference pulse waveform data series and the offset degree of the reference level are optimally controlled. Thereby, the motor current can be made to present the sinusoidal wave and a circuit configuration thereby can be further simplified.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing a modified reference pulse wave data series for use in an inverter type motor control circuit comprising the steps of:

storing data representative of a sinusoidal wave corresponding to a reference level;

shifting the data a predetermined number of degrees in a positive direction, such that the shifted data represents a sinusoidal wave offset by the predetermined number of degrees from the sinusoidal wave corresponding to the reference level;

adding a correction value to the shifted data, producing corrected data;

multiplying the corrected data by a normalization factor to produce normalized data; and multiplying the normalized data by a voltage value to produce the modified reference pulse wave data series.

2. An inverter type motor control circuit for producing a modified reference pulse waveform series, comprising:

means for storing data representative of a sinusoidal wave corresponding to a reference level;

means for shifting the data a predetermined number of degrees in a positive direction, such that the shifted data represents a sinusoidal wave offset by the predetermined number of degrees from the sinusoidal wave corresponding to the reference level;

means for adding a correction value to the shifted data to produce corrected data;

means for multiplying the corrected data by a normalization factor to produce normalized data; and means for multiplying the normalized data by a voltage value to produce the modified reference pulse waveform data.

* * * * *